(12) United States Patent
Suzuki et al.

(10) Patent No.: US 7,315,696 B2
(45) Date of Patent: *Jan. 1, 2008

(54) GAIN SETTING METHOD IN WAVELENGTH DIVISION MULTIPLEX TRANSMISSION EQUIPMENT

(75) Inventors: Manabu Suzuki, Kawasaki (JP); Miwa Taniguchi, Kawasaki (JP); Toshihiro Suzuki, Kawasaki (JP); Shingo Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 633 days.

This patent is subject to a terminal disclaimer.

(21) Appl. No.: 10/725,577

(22) Filed: Dec. 3, 2003

(65) Prior Publication Data

US 2004/0109694 A1    Jun. 10, 2004

(30) Foreign Application Priority Data

Dec. 4, 2002    (JP)    ............................ 2002-352504

(51) Int. Cl.
H04B 10/08    (2006.01)
H04B 17/02    (2006.01)
H04B 10/17    (2006.01)
H04J 14/02    (2006.01)
H01S 3/00    (2006.01)

(52) U.S. Cl. .......................... 398/177; 398/37; 398/97; 398/157; 398/173; 359/341.41

(58) Field of Classification Search .................. 398/34, 398/37

See application file for complete search history.

(56) References Cited

U.S. PATENT DOCUMENTS 6,049,413 A * 4/2000 Taylor et al. ............... 359/337

| | | | |
|---|---|---|---|
| 6,600,596 B2 * | 7/2003 | DeGrange, Jr. et al. . | 359/341.4 |
| 7,002,734 B2 * | 2/2006 | Horachi et al. .......... | 359/341.4 |
| 2002/0039226 A1 * | 4/2002 | Murakami et al. .......... | 359/337 |
| 2002/0060837 A1 * | 5/2002 | Inagaki et al. ............... | 359/337 |
| 2002/0154359 A1 * | 10/2002 | Tsuda et al. ................. | 359/124 |
| 2005/0047781 A1 * | 3/2005 | El-Reedy et al. ............. | 398/37 |
| 2006/0082868 A1 * | 4/2006 | Yamashita ................... | 359/337 |

FOREIGN PATENT DOCUMENTS

| | | |
|---|---|---|
| EP | 1085683 A1 * | 3/2001 |
| JP | 9-107141 | 4/1997 |
| WO | WO 0165736 A1 * | 9/2001 |

* cited by examiner

Primary Examiner—Kenneth Vanderpuye
Assistant Examiner—David S Kim
(74) Attorney, Agent, or Firm—Staas & Halsey LLP

(57) ABSTRACT

Gain setting of a receiving amplifier, is performed by detecting the necessity of gain setting when a receiving amplifier is turned on, requesting WDM transmission equipment in a preceding station to output ASE light; in a WDM transmission equipment of the preceding station, shutting off both passing-through light and added light, and outputting the ASE light corresponding to a predetermined number of wavelengths of signal light; in the receiving amplifier of the WDM transmission equipment in the station of interest, performing the gain setting by use of the ASE light; and on completion of the gain setting, the WDM transmission equipment of the station of interest, requesting the WDM transmission eouipment of the preceding station to halt the ASE light output, and the WDM transmission equipment of the preceding station, halting the ASE light output upon receiving the request and switching the output to an optical signal output.

12 Claims, 11 Drawing Sheets

Comparison chart of the LD Currents in the AGC mode and the ASE mode

GAIN SETTING METHOD IN WAVELENGTH DIVISION MULTIPLEX TRANSMISSION EQUIPMENT

FIELD OF THE INVENTION

The present invention relates to a gain setting method in wavelength division multiplex transmission equipment and more particularly a gain setting method for an optical fiber amplifier by use of amplified spontaneous emission (ASE) generated by excited light.

BACKGROUND OF THE INVENTION

In the field of optical transmission technology, the wavelength division multiplexing (WDM) transmitting a plurality of optical signals of different wavelengths has been put into practical use in recent years, and the technology is being improved still more.

FIG. 1 shows a configuration example of wavelength division multiplex (WDM) transmission equipment in a WDM optical transmission system, in which two sets of neighboring relay equipment are shown among a plurality sets of relay equipment connected in tandem.

In neighboring stations A, B each constituted of such WDM transmission equipment, signal light output from the station A is transmitted to the station B on a transmission line 202. The signal light is input into a receiving amplifier (pre-amplifier) 111 in a receiving amplifier unit 120 of the station B.

The signal light amplified in receiving amplifier 111 is then demultiplexed by a wavelength demultiplexer (DMUX) 112 into signal light of different wavelengths, and the signal path is selected (so as to pass through or add/drop) in an optical switch 113.

As for wavelength light having passed through optical switch 113, the level is adjusted for each wavelength in a variable optical attenuator (VOA) 114, and input into a wavelength multiplexer (MUX) 115 provided in a transmitting amplifier unit 130. The light is wavelength-multiplexed in wavelength multiplexer (MUX) 115, amplified in a transmitting amplifier (post-amplifier) 116 of a transmitting amplifier unit 130, and further transmitted to a non-illustrated succeeding station located on the east side through a transmission line 203.

Here, receiving amplifier (pre-amplifier) 111, as well as transmitting amplifier (post-amplifier) 116, is provided with an optical amplifier which uses excited light produced by a laser diode (LD). The amplification factor is controlled by the amount of laser diode (LD) current.

Meanwhile, wavelength light dropped in optical switch 113 is transmitted to another network through a transmission line 207. Also, the level of a newly added wavelength light input from a transmission line 206 and added in optical switch 113 is adjusted in variable optical attenuator (VOA) 114 and then wavelength-multiplexed in wavelength multiplexer (MUX) 115, in a similar way to the aforementioned passing-through wavelength light. The light is also amplified in transmitting amplifier 116 and further transmitted to the non-illustrated succeeding station located on the east side through transmission line 203.

Similarly, signal light output from the station B to the station A is transmitted through a transmission line 212, and input into a receiving amplifier 141 provided in a receiving amplifier unit 230 in the station A. The signal light amplified in receiving amplifier 141 of the station A is demultiplexed to each wavelength in a wavelength demultiplexer (DMUX) 142, and the signal path is selected (so as to pass through or add/drop) in an optical switch 143. The passing-through signal light, as well as signal light transmitted from a transmission line 216 and added in optical switch 143, is level-adjusted for each wavelength in a variable optical attenuator (VOA) 144, wavelength-multiplexed in a wavelength multiplexer (MUX) 145 of a transmitting amplifier unit 240, amplified in a transmitting amplifier 146, and transmitted to a non-illustrated succeeding station on the west side through a transmission line 213.

In such a way, by way of example in the conventional art, WDM transmission equipment is connected in tandem, through which optical transmission is performed bi-directionally, as well as add/drop of optical signals (for example, refer to Japanese Patent Number 3,241,337).

Here, in both receiving amplifier and transmitting amplifier provided in WDM transmission equipment, it is required to amplify optical signals so that a signal level becomes constant for each wavelength. For this purpose, it is necessary to achieve an appropriate gain (degree of amplification) setting in each amplifier.

By way of example, in transmitting amplifier 106 provided in transmitting amplifier unit 110 of the station A, and also in receiving amplifier 111 provided in receiving amplifier unit 120 of the station B, the gain can uniquely be determined because the optical signal is input into transmitting amplifier 106 after each level of the wavelength light is adjusted in variable optical attenuator (VOA) 104.

However, as for receiving amplifier 111 in the station B, an input light level depends on a transmission line loss, etc. produced in transmission line 202. Therefore, when the power of receiving amplifier 111 is turned on, and when a fiber is replaced or a break of the fiber is restored in transmission line 202, it is necessary to determine the gain of receiving amplifier 111 so as to fit the input level into receiving amplifier 111.

Here, in order to set the gain of receiving amplifier 111 correctly, it is necessary to input light having a stable level with a constant number of wavelengths into receiving amplifier 111 while the gain setting of receiving amplifier 111 is in progress.

For this purpose, it is required to stabilize the light output from transmitting amplifier 106 and to supply stable light with a constant number of wavelengths to receiving amplifier 111, by supplying stable input light with a constant number of wavelengths to transmitting amplifier 106.

To cope with the above-mentioned requirement, in case of providing input light having a constant number of wavelengths with stable light level to transmitting amplifier 106, there may be a method of stopping passing-through light transmitted from the preceding station to the station A, and setting added light by means of optical switch 103 in the station A, or, alternatively, a method of preparing a light source 107 to produce reference light and thereby inputting constant light to transmitting amplifier 106.

As a method for stopping the passing-through light from the preceding station to the station A, there may be a method of dropping the passing-through light entirely to transmission line 205. Or, alternatively, it may be possible to attenuate the passing-through light invariable optical attenuator (VOA) 104.

However, according to the methods described above, it is necessary to prepare a light source to be connected to transmission line 204 for added light, or light source 107 for supplying the reference light. It causes a problem of increased cost for preparing such light sources throughout the stations connected in tandem.

Also, in the case of setting the receiving amplifier gain by use of a light source for starting up the receiving amplifier, considering a receiving amplifier in a span with no light source prepared, there is a method of setting the gain using output light of the transmitting amplifier located in the preceding span. In this method, the gain setting of the receiving amplifier concerned will be performed after the gain setting for the receiving amplifier in the preceding span is completed.

However, according to this method, the gain settings must be performed successively from the receiving amplifier in the span in which the light source is provided. Therefore, this method causes another problem of taking substantial time for the entire spans to complete the gain settings for the entire receiving amplifiers.

Also, when setting the receiving amplifier gain in a span having no light source, if other spans are in operation for service, there is a problem of requiring temporary suspension of the service ranging from a span having the light source to a span having no light source, in order to perform the gain setting of the receiving amplifier which has no light source.

Further, when stopping the passing-through light to transmitting amplifier 106 by use of variable optical attenuator (VOA) 104, this variable optical attenuator (VOA) 104 cannot completely attenuate the passing-through light, and produces leak light. When the leak light is produced, a problem of an unstable input to receiving amplifier 111 arises, which impedes correct gain setting. Accordingly, it becomes an issue to shut off completely the leak light which leaks to transmitting amplifier 106.

Moreover, when the gain setting of receiving amplifier 111 is required, the necessity of the gain setting of receiving amplifier 111 has to be recognized by a maintenance person, and the input light for setting the gain of receiving amplifier 111 has to be set. After the gain setting procedure for receiving amplifier 111 is completed, it is also necessary for the maintenance person to restore the input light having been used for the gain setting of receiving amplifier 111, and instruct signal light setting. As such, the maintenance person has to intervene frequently to complete the receiving amplifier gain setting. This produces a load to the maintenance person, as well as an increased possibility of an operational error.

Also, when setting the gain of receiving amplifier 111, there arises a problem that signal light of a wavelength identical to the wavelength of the light for gain setting is corrupted (namely, the signal light becomes useless). To cope with this problem, when setting the gain of receiving amplifier 111, it becomes necessary to input the input light having a stable light level to receiving amplifier 111 without changing the setting of the existent signal light.

SUMMARY OF THE INVENTION

Accordingly, it is an object of the present invention to provide a method for setting a reception amplifier gain in WDM transmission equipment to solve the above-mentioned problems.

As a first aspect of the gain setting method for a receiving amplifier in WDM transmission equipment to attain the above-mentioned object, there is disclosed a gain setting method for the receiving amplifier in a network constituted with a multi-stage connection of a plurality sets of WDM transmission equipment, each having a receiving amplifier amplifying a WDM signal received from a preceding station, and a transmitting amplifier outputting a WDM signal to a succeeding station. The method includes; detecting the necessity of gain setting of the receiving amplifier when the power of the receiving amplifier is turned on, and requesting WDM transmission equipment in the preceding station to output ASE light; in the WDM transmission equipment of the preceding station, based on the request for ASE light output, shutting off both passing-through light and added light, and outputting the ASE light corresponding to a predetermined number of wavelengths of signal light; in the receiving amplifier of the WDM transmission equipment in the station of interest, performing the gain setting by use of the ASE light; and on completion of the gain setting, in the WDM transmission equipment of the station of interest, shifting to receive an optical signal, and in the WDM transmission equipment of the preceding station, switching over to optical signal output.

As a second aspect of the gain setting method for a receiving amplifier in WDM transmission equipment to attain the above-mentioned object, there is disclosed a gain setting method for the receiving amplifier in a network constituted with a multi-stage connection of a plurality sets of WDM transmission equipment, each having a receiving amplifier amplifying a WDM signal received from a preceding station, and a transmitting amplifier outputting a WDM signal to a succeeding station. The method includes; detecting the necessity of gain setting of the receiving amplifier at the time of either restoration from a break or replacement of the fiber connecting the WDM transmission equipment sets, and requesting WDM transmission equipment in the preceding station to output ASE light; in the WDM transmission equipment of the preceding station, based on the request for ASE light output, shutting off both passing-through light and added light, and outputting the ASE light corresponding to a predetermined number of wavelengths of signal light; in the receiving amplifier of the WDM transmission equipment in the station of interest, performing the gain setting by use of the ASE light; and on completion of the gain setting, in the WDM transmission equipment of the station of interest, shifting to receive an optical signal, and in the WDM transmission equipment of the preceding station, switching over to optical signal output.

As a third aspect of the gain setting method for a receiving amplifier in WDM transmission equipment to attain the above-mentioned object, in the above-mentioned first or second aspect, the ASE light corresponding to the predetermined number of wavelengths of the signal light is ASE light corresponding to one wavelength of the signal light.

As a fourth aspect of the gain setting method for a receiving amplifier in WDM transmission equipment to attain the above-mentioned object, in the above-mentioned first or second aspect, each plurality set of WDM transmission equipment includes a network element which overall controls each WDM transmission equipment set. At the time of turning on the power of the receiving amplifier in the WDM transmission equipment of the station of interest, the network element in the station of interest detects the necessity of the gain setting of the receiving amplifier.

As a fifth aspect of the gain setting method for a receiving amplifier in WDM transmission equipment to attain the above-mentioned object, in the above-mentioned first or second aspect, the shutoff of both the passing-through light and the added light is performed by closing a shutter disposed on the input side of the transmitting amplifier.

As a sixth aspect of the gain setting method for a receiving amplifier in WDM transmission equipment to attain the above-mentioned object, in the above-mentioned fifth aspect, when outputting the ASE light, the transmitting amplifier in the preceding station supervises a condition of the shutter disposed on the input side of the transmitting amplifier. On occurrence of a malfunction, the malfunction is reported to a maintenance person.

As a seventh aspect of the gain setting method for a receiving amplifier in WDM transmission equipment to attain the above-mentioned object, in the above-mentioned first or second aspect, the WDM transmission equipment of the station of interest supervises a stable condition of the ASE light output of the transmitting amplifier in the preceding station. On detection of an unstable condition of the transmitting amplifier in the preceding station while the gain setting of the receiving amplifier is being performed in the station of interest, the gain setting of the receiving amplifier in the station of interest is canceled. After detecting a stable condition of the ASE light output of the transmitting amplifier in the preceding station, the gain setting of the receiving amplifier in the station of interest is performed afresh.

Further scopes and features of the present invention will become more apparent by the following description of the embodiments with the accompanied drawings.

DETAILED DESCRIPTION OF THE PREFERRED EMBODIMENTS

The preferred embodiment of the present invention is described hereinafter referring to the charts and drawings.

Figure 1:
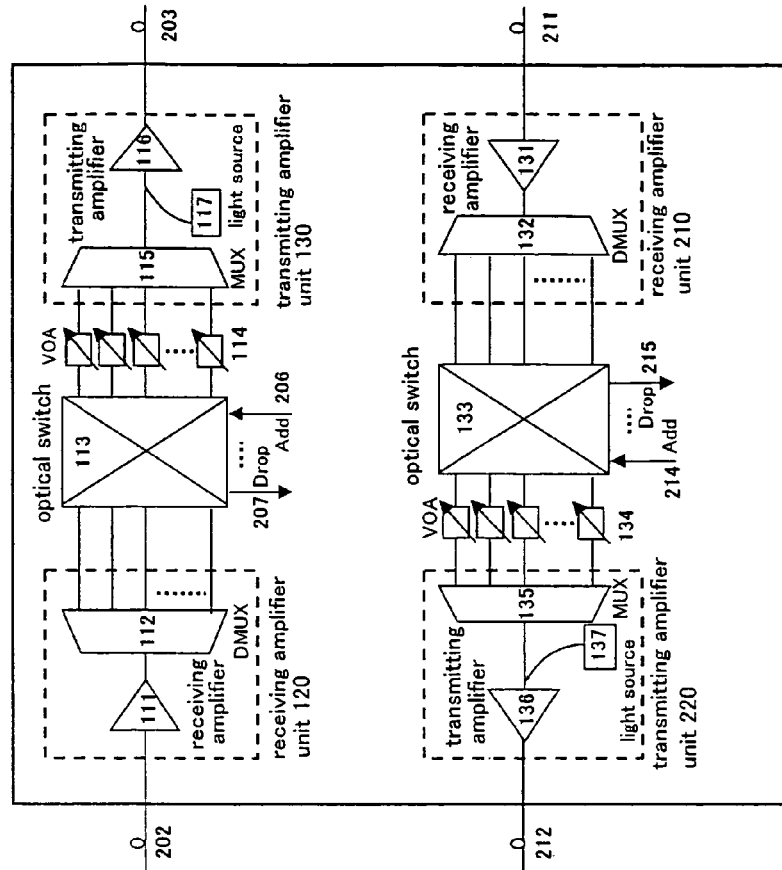
FIG. 1 shows a configuration example of wavelength division multiplex (WDM) transmission equipment, illustrated as two neighboring sets of relay equipment.
Figure 2:
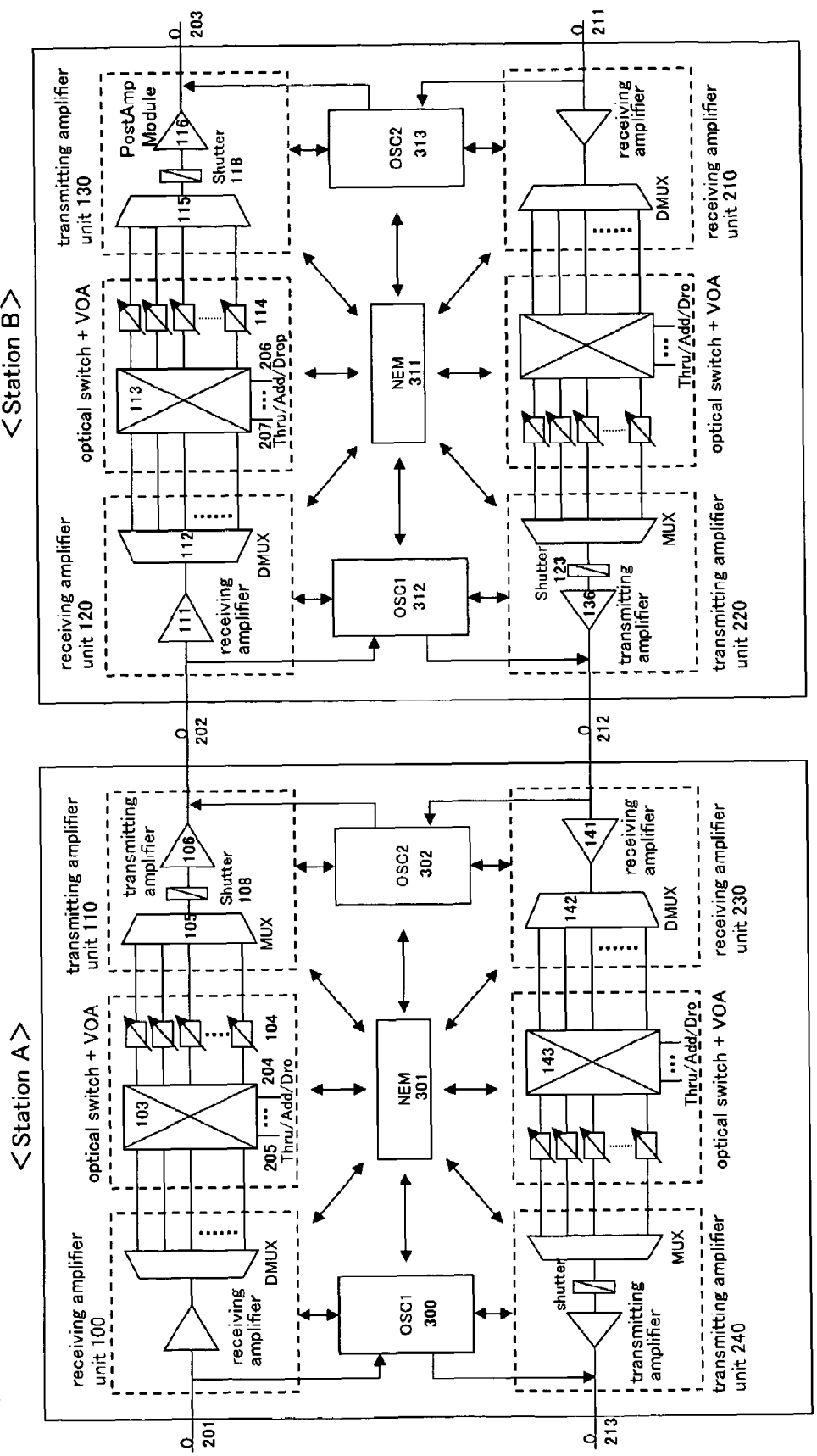
FIG. 2 shows an embodiment of the WDM transmission equipment, illustrated as relay equipment in the WDM optical transmission system in accordance with the present invention.
Figure 3:
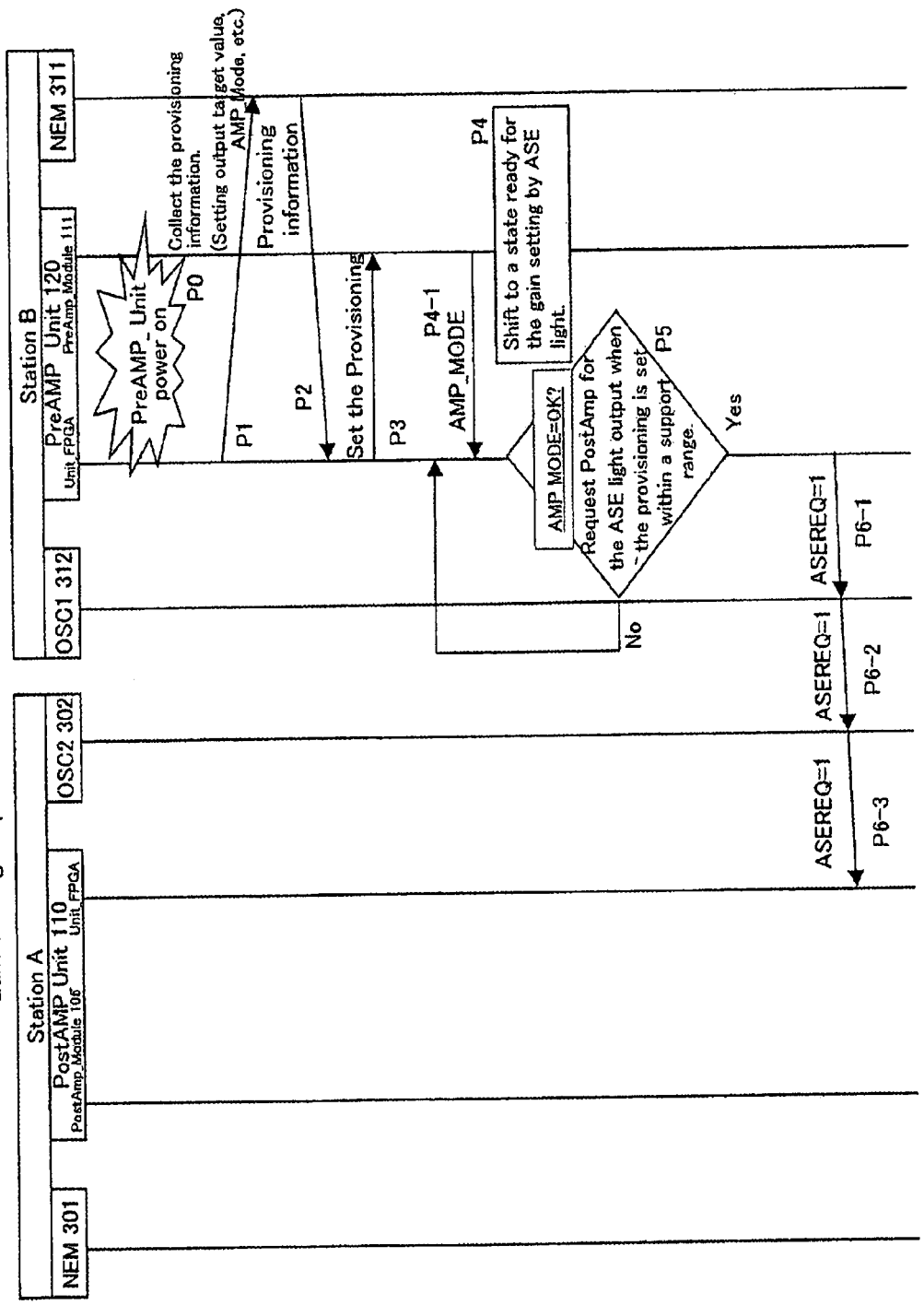
FIG. 3 shows an operation flow (part 1) in accordance with a first embodiment using the configuration shown in FIG. 2.

FIG. 2 shows an embodiment of wavelength division multiplex (WDM) transmission equipment, illustrated as relay equipment in a WDM optical transmission system in accordance with the present invention. FIGS. 3-9 show operation flow using the configuration shown in FIG. 2, and FIG. 10 shows a chart illustrating the relations of FIGS. 3-9.

Figure 8:
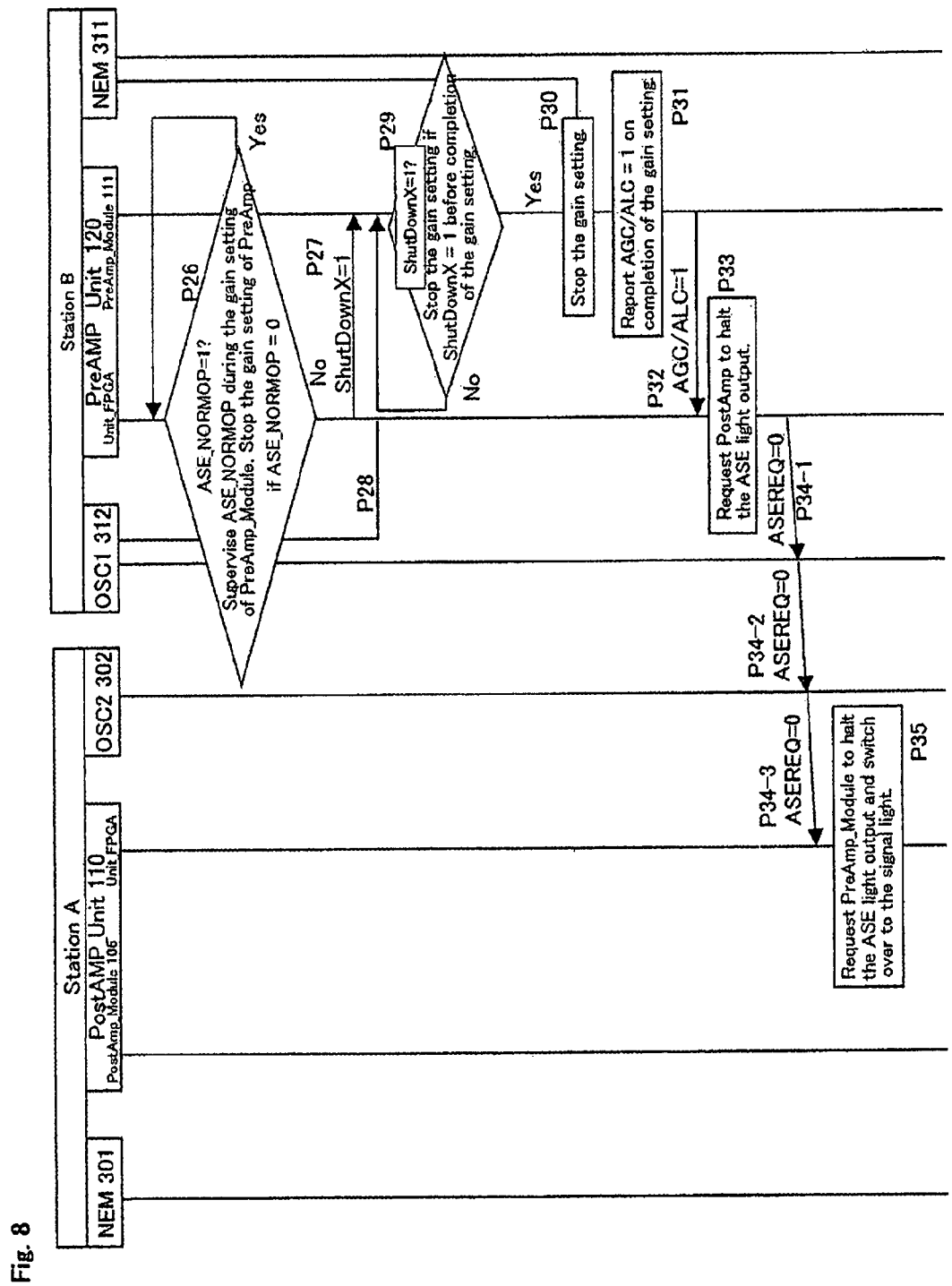
FIG. 8 shows an operation flow (part 3) commonly for use in the first to fourth embodiments.
Figure 9:
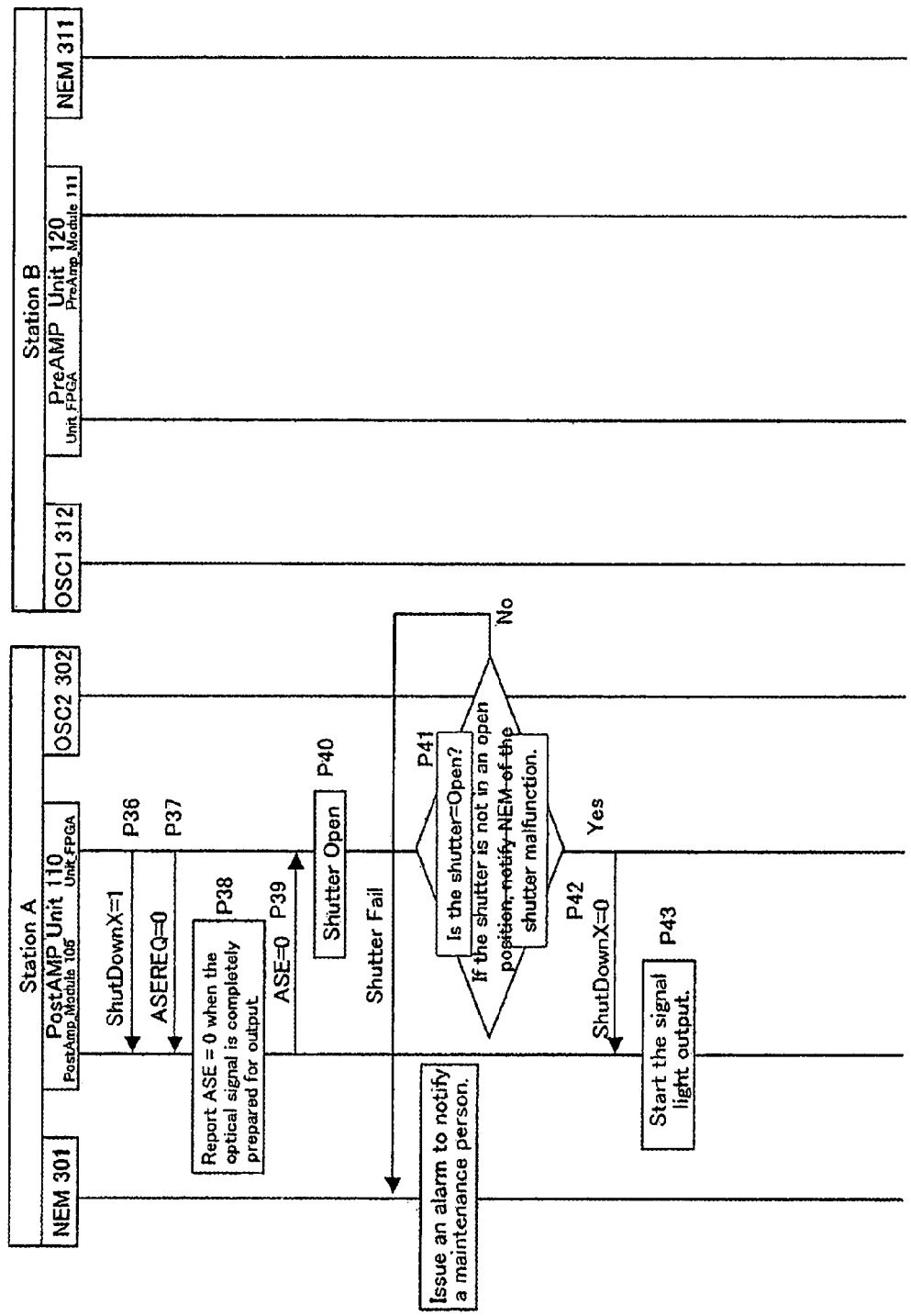
FIG. 9 shows an operation flow (part 4) commonly for use in the first to fourth embodiments.
Figure 10:
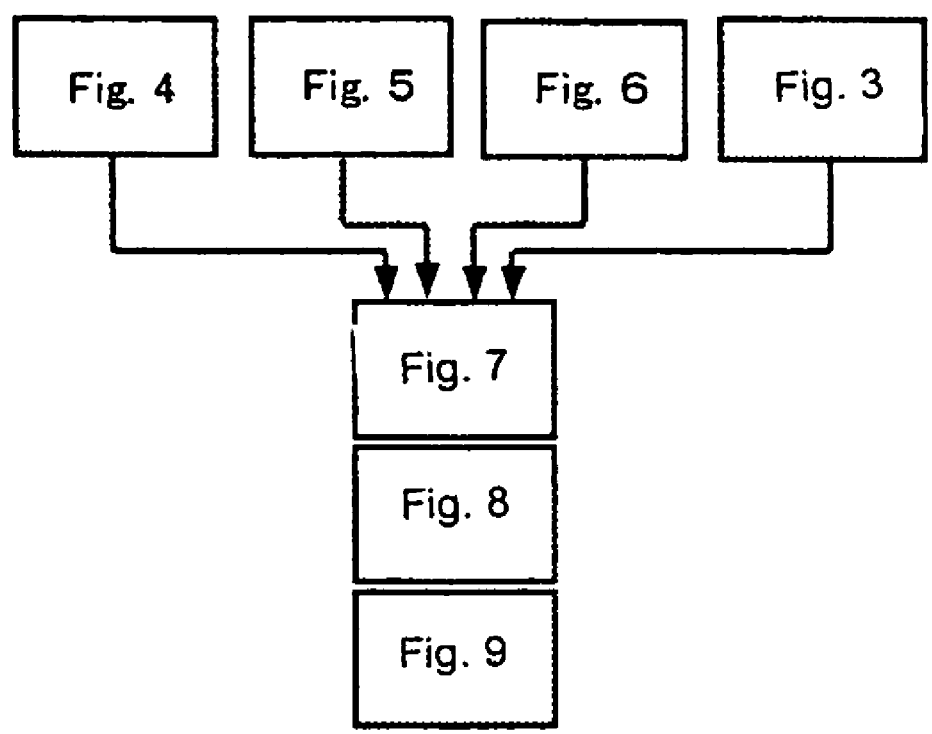
FIG. 10 shows a diagram illustrating the relations of FIG. 3 to FIG. 9.

As shown in FIG. 10, an operation according to an embodiment of the present invention is constituted of, for example, the flow shown in FIG. 3 and FIGS. 7 to 9. By replacing the portion shown as FIG. 3, different embodiments each constituted of any one of FIGS. 4, 5, and 6 can be obtained.

First, referring to FIG. 3 and FIGS. 7-9, the exemplary operation of a first embodiment shown in FIG. 2 will be explained hereafter.

In FIG. 2, a network element (NEM) 311 in the station B is a device for controlling the overall station B. When power is turned on for a receiving amplifier (pre-amplifier) unit 120 of the station concerned (i.e. the station B) (process P0), condition information for gain setting (provisioning information) is requested from a non-illustrated controller in receiving amplifier unit 120 to network element (NEM) 311 (process P1).

In response to this, the provisioning information is sent from network element (NEM) 311 to the controller in receiving amplifier unit 120 (process P2).

The controller in receiving amplifier unit 120 then orders receiving amplifier 111 to perform the setting corresponding to the provisioning information (process P3).

When receiving amplifier 111 is requested to perform gain control by use of ASE light, a condition such as an output target value (provisioning) is set into receiving amplifier 111 in the WDM transmission equipment of the station B.

On completion of the provisioning setting into receiving amplifier 111, receiving amplifier 111 enters into a state ready for gain setting by use of the ASE light (process P4), notifies the controller of an AMP mode (process P4-1), and enters into a state of requesting transmitting amplifier unit 110 in the station A for outputting the ASE light, if receiving amplifier 111 is set within a support range ('Yes' in process P5).

Here, the ASE light is amplified spontaneous emission (ASE) light induced from the light pumped by a laser diode (LD) which is supplied to an optical fiber amplifier for use as transmitting amplifier 106.

Figure 11:
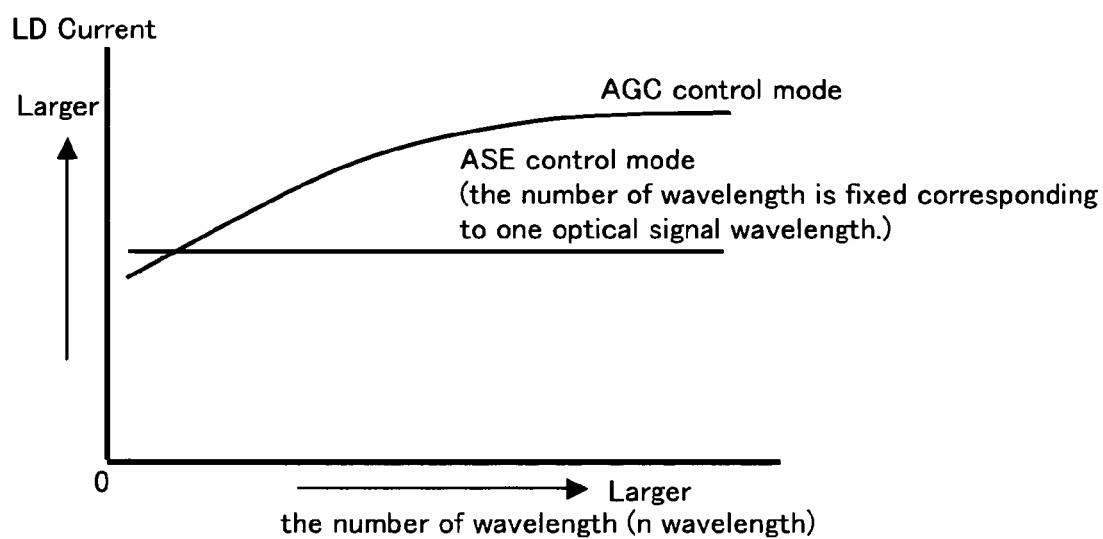
FIG. 11 shows a comparison chart of the LD currents in the AGC mode and the ASE mode.

Further, the gain control by use of the ASE light is as shown in FIG. 11. In the AGC control mode, as shown in this figure, the LD current (shown on the vertical axis) for exciting receiving amplifier 111 becomes larger as the number of input wavelengths (shown on the horizontal axis) becomes larger. In contrast, in the ASE control mode, the number of wavelengths sent from transmitting amplifier 106 is fixed corresponding to one optical signal wavelength, and therefore the LD current for excitation for receiving amplifier 111 becomes constant. This enables easy gain setting.

When the gain control by use of ASE light is requested, an OSC information signal having ASEREQ=1, indicative of an ASE light output request, is notified from an optical signal controller (OSC) 312 in the WDM transmission equipment of the station B to transmitting amplifier unit 110 in the station A, through transmission line 212 and an optical signal controller (OSC) 302 in the WDM transmission equipment of the station A (processes P6-1, 6-2, 6-3).

Figure 7:
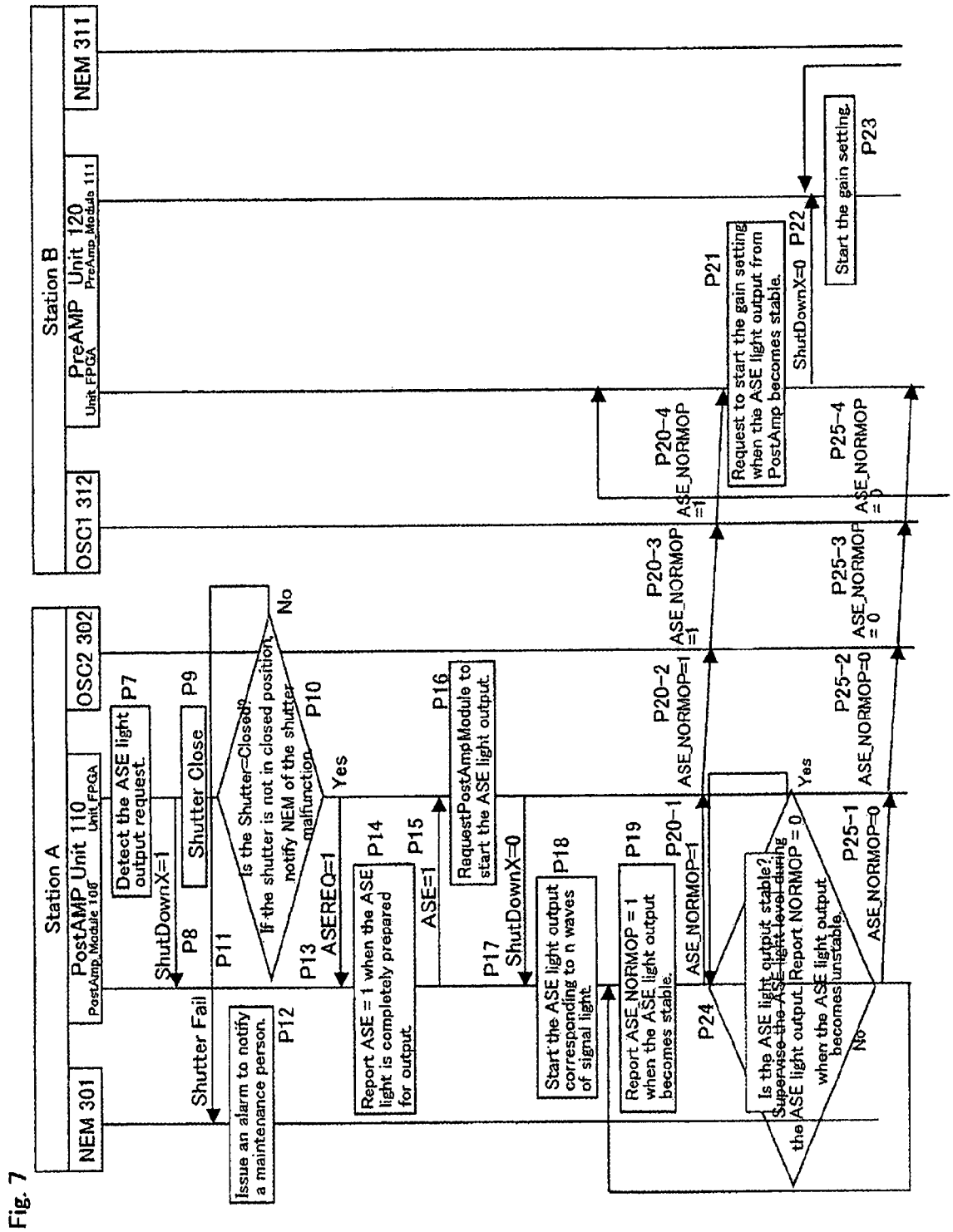
FIG. 7 shows an operation flow (part 2) commonly for use in the first to fourth embodiments.

Next, the process proceeding to FIG. 7, on detecting the information signal ASEREQ=1 (process P7), the controller in transmitting amplifier unit 110 of the station A sends an information signal ShutDownX=1 to transmitting amplifier 106 to shift transmitting amplifier 106 into a shutoff state (process P8).

Also, the controller in transmitting amplifier unit 110 controls a shutter 108 to shut off both the passing-through light and the added light input to transmitting amplifier 106 (process P9).

Next, a close condition of shutter 108 by the shut-off control against shutter 108 in process P9 is confirmed. If this shutter 108 is not closed ('No' in process P10), this malfunction condition is reported to network element (NEM) 301 in the station A (process P11).

On receipt of the malfunction condition information from the controller in transmitting amplifier unit 110, network element (NEM) 301 issues an alarm to notify a maintenance person of the malfunction condition (process P12).

On the other hand, when the close condition of shutter 108 is confirmed in process P10 ('Yes' in process P10), the aforementioned information signal ASEREQ=1 is sent to transmitting amplifier 106 (process P13).

Based on the information signal ASEREQ=1, transmitting amplifier 106 generates an information signal ASE=1 when the ASE light is completely prepared for output (process P14), and reports this to the controller in transmitting amplifier unit 110 (process P15).

On receipt of the information signal ASE=1, the controller in transmitting amplifier unit 110 sends an information signal ShutDownX=0 to transmitting amplifier 106 to remove the shutdown condition (process P17). Transmitting amplifier 106 then starts to output the ASE light corresponding to n waves of signal light (process P18).

When the ASE light output corresponding to n waves of signal light becomes stable, transmitting amplifier 106 generates an information signal ASE_NORMOP=1, indicative of the output in a stable condition (process P19). Transmitting amplifier 106 then reports this information signal ASE_NORMOP=1 to receiving amplifier unit 120 in the station B, through optical signal controller (OSC) 302, transmission line 202 and optical signal controller (OSC) 312 in the station B, using an OSC signal (processes P20-1, 20-2, 20-3, 20-4).

On detection of the information signal ASE_NORMOP=1, the controller in receiving amplifier unit 120 of the station B requests receiving amplifier 111 to start the gain setting in receiving amplifier 111 (process P21). This request is notified in the form of an information signal ShutDownX=0 (process P22).

Thus, receiving amplifier 111 starts the gain setting (process P23). Meanwhile, the controller in transmitting amplifier unit 110 supervises the stability of the ASE light output level of transmitting amplifier 106. When the ASE light output becomes unstable ('No' in process P24), the controller in transmitting amplifier unit 110 reports this condition by sending an information signal ASE_NORMOP=0 to receiving amplifier unit 120 in the station B, through optical signal controller (OSC) 302, transmission line 202 and optical signal controller (OSC) 312 in the station B, using an OSC signal (processes P25-1, 25-2, 25-3, 25-4).

Next, the process proceeds to FIG. 8. The controller in receiving amplifier unit 120 of the station B detects whether the information signal still remains as ASE_NORMOP=1 (process P26). If the information signal has been changed to ASE_NORMOP=0 ('No' in process P26), the controller in receiving amplifier unit 120 sends an information signal ShutDownX=1 to receiving amplifier unit 120 (process P27), and the process returns to process P21 (refer to FIG. 8).

Receiving amplifier 111 detects whether the information signal has been changed to ShutDownX=1 (process P29). If the information signal has been changed to ShutDownX=1 ('Yes' in process P29), receiving amplifier 111 cancels the gain control (process P30).

If the gain control has been completed, an information signal AGC/ALC=1 is issued (process P31). This information signal AGC/ALC=1 is reported to the controller in receiving amplifier unit 120 (process P32). On receipt of this information signal, the controller in receiving amplifier unit 120 requests transmitting amplifier 106 in transmitting amplifier unit 110 of the station A to halt the ASE light output (process P33).

To enable this request, an information signal ASEREQ=0 is sent to the controller in transmitting amplifier unit 110, through optical signal controller (OSO) 312, transmission line 212 and optical signal controller (OSO) 302 in the station A, using an QSC signal (processes P34-1, 34-2, 34-3).

On receipt of the information signal ASEREQ=0, the controller in transmitting amplifier unit 110 of the station A controls transmitting amplifier 106 to halt the ASE light output and switch over to the signal light (process P35). Proceeding to FIG. 9, this control is performed by sending information signals ShutDownX=1 and ASEREQ=0 from the controller in transmitting amplifier unit 110 to transmitting amplifier 106 (processes P36, P37).

Based on the above-mentioned information signals, transmitting amplifier 106 outputs an information signal ASE=0 when the signal light is completely prepared for output (process P38), and reports to the controller in transmitting amplifier unit 110 of the station A (process P39).

On receipt of the information signal ASE=0 from transmitting amplifier 106, the controller in transmitting amplifier unit 110 controls to open shutter 108 (process P40). After confirming shutter 108 is open ('Yes' in process P41), the controller sends an information signal ShutDownX=0 to transmitting amplifier 106 (process P42), and starts to output the signal light (process P43).

Now, referring back to FIG. 4, the operation of a second embodiment will be described in the following. In the embodiment example shown in FIG. 4, whether the power is turned on is inquired from network element (NEM) 311 in the station B to the controller in receiving amplifier unit 120, using the polling (process P0-1). In response to this, an information signal RMV, indicative of the power off, is sent back to network element (NEM) 311 in the station B, until the power of receiving amplifier 111 is turned on (process P0-2).

When the power of receiving amplifier 111 is turned on (process P0), in response to the inquiry whether or not the power is turned on (process P0-1), an information signal RMV_Clear, indicative of the power on, is sent back (process P0-3). As a result, network element (NEM) 311 detects the power of receiving amplifier 111 turned on (process P0-4).

Meanwhile, in the state that the power of receiving amplifier 111 is on, when the information signal indicative of the power turned on is sent back to network element (NEM) 311, the controller in receiving amplifier unit 120 of the station B requests network element (NEM) 311 to send condition (provisioning) information for gain setting (process P1).

In response to this, network element (NEM) 311 sends the provisioning information to the controller in receiving amplifier unit 120 of the station B (process P2).

In receiving amplifier unit 120, the controller orders receiving amplifier unit 120 to perform the setting corresponding to the provisioning information (process P3).

When receiving amplifier 111 is requested for gain control by use of the ASE light, the provisioning such as an output target value is set into receiving amplifier 111 in the WDM transmission equipment of the station B.

Meanwhile, the AMP mode is reported from receiving amplifier 111 to the controller (process P4-1), and further the AMP mode is reported from the controller to network element (NEM) 311 (process P4-2).

Accordingly, in network element (NEM) 311, it is checked whether receiving amplifier 111 is set within a support range (process P5-1). If receiving amplifier 111 is set within the support range, an information signal ASEREQ=1, indicative of an ASE light output request, is sent from network element (NEM) 311 to the controller.

On receipt of the information signal ASEREQ=1, the controller generates a gain setting request signal XAL-CREQ=0 for receiving amplifier 111 to set the gain by use of the ASE light (process P5-3), and notify receiving amplifier 111 of this request (process P5-4).

Thus, receiving amplifier 111 shifts into a state ready for the gain setting by use of the ASE light (process P4).

The controller then reports the information ASEREQ=1, indicative of the ASE light output request, to transmitting amplifier unit 110 in the station A, through optical signal controller (OSC) 312 in the WDM transmission equipment of the station B, transmission line 212 and optical signal controller (OSC) 302 in the station A, using an OSC signal (processes P6-1, 6-2, 6-3).

Figure 4:
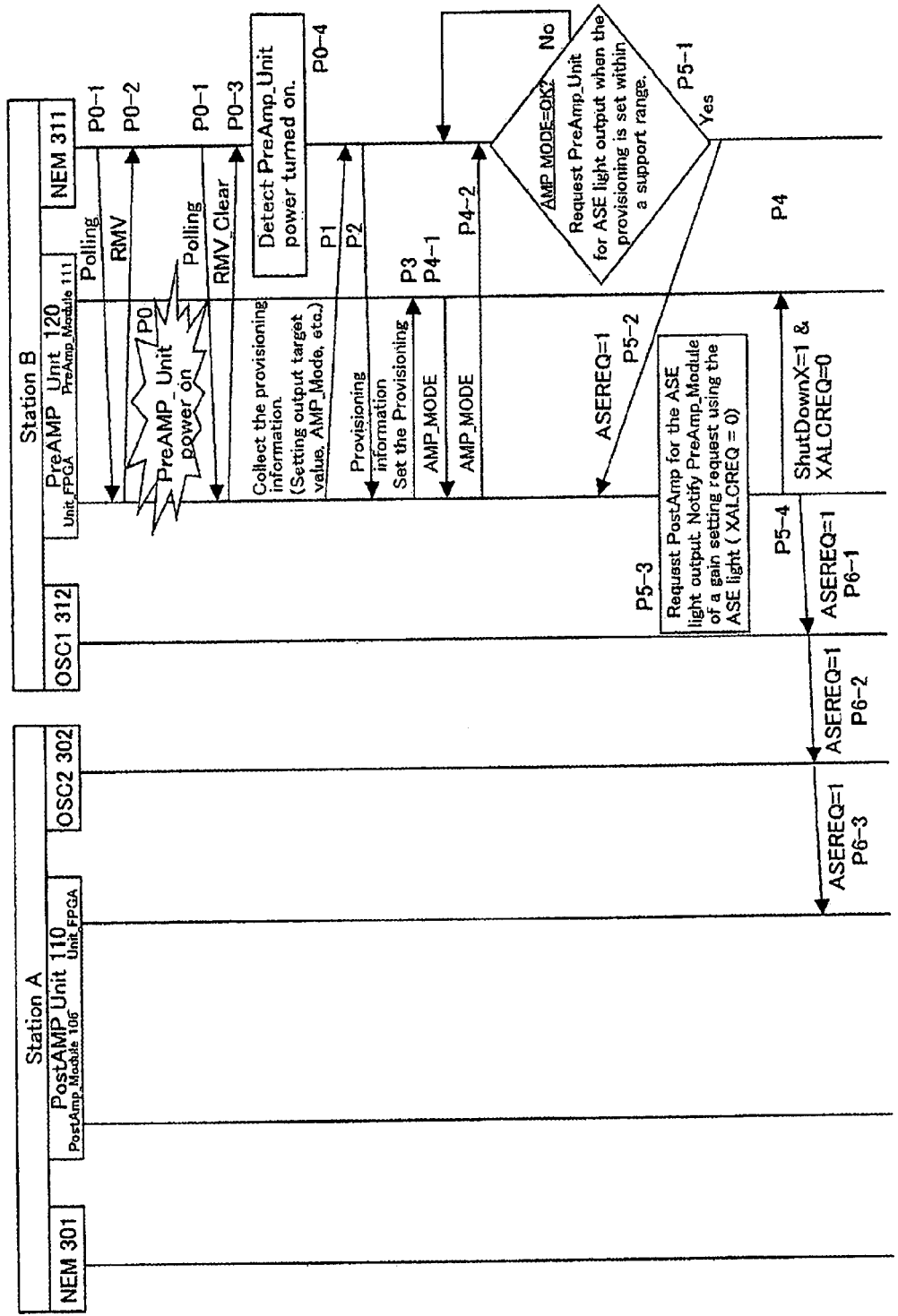
FIG. 4 shows an operation flow (part 1) in accordance with a second embodiment using the configuration shown in FIG. 2.

The operation flow succeeding FIG. 4 is identical to the aforementioned process flow shown in FIGS. 7-9.

By performing the operation processes shown in FIGS. 3, 4, and 7-9, it becomes possible to complete the gain setting of receiving amplifier 111 automatically without need of additional light source, when the power of receiving amplifier unit 120 is turned on. Further, because an additional light source is not necessary, it is possible to perform the receiving amplifier gain setting simultaneously in the entire stations, performing independent operation in each span.

Now, the following describes a case of restoration from a fiber break, as well as a case of fiber replacement, in transmission line 202 located between the station A and the station B in FIG. 2.

Figure 5:
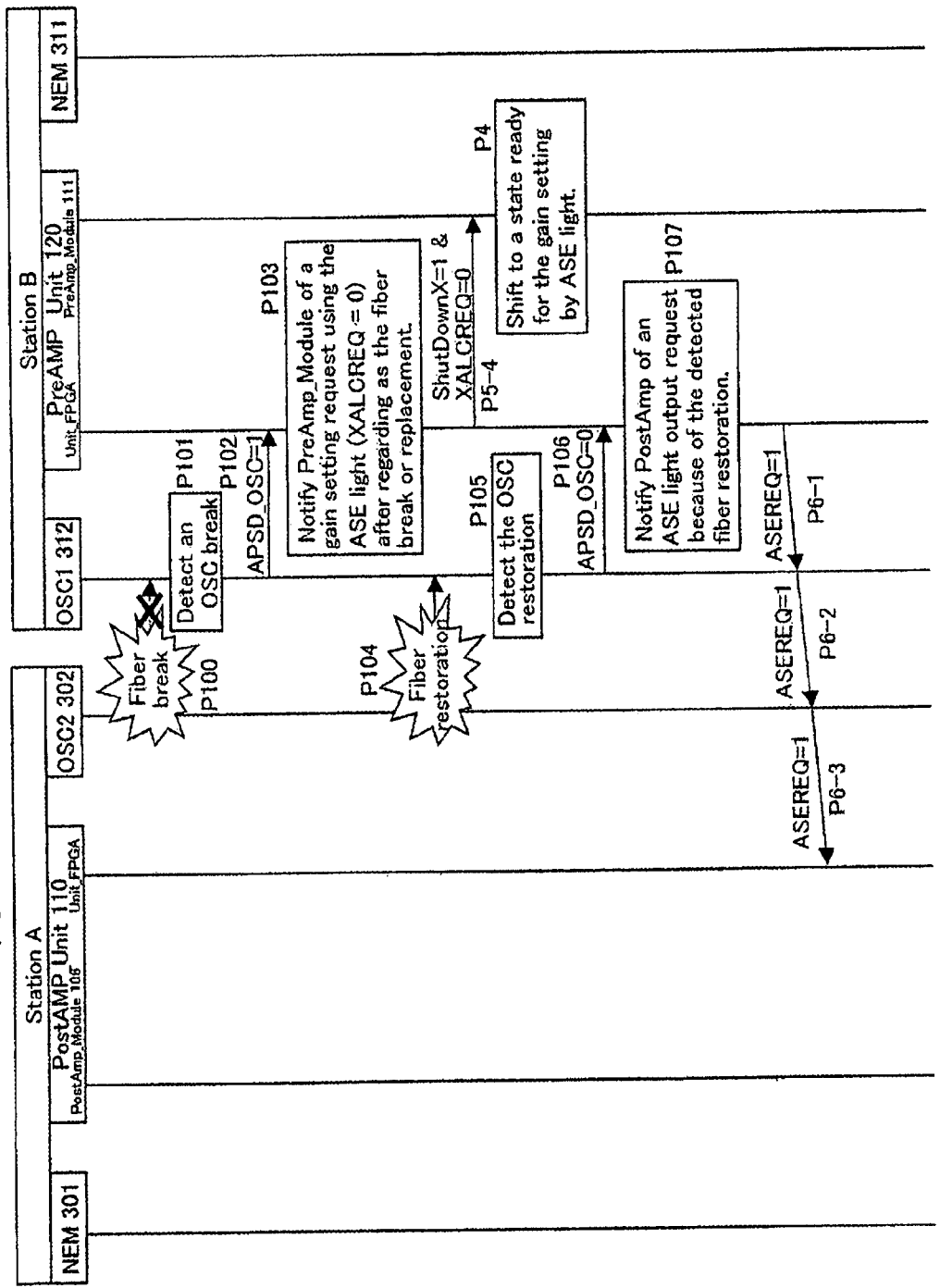
FIG. 5 shows an operation flow (part 1) in accordance with a third embodiment using the configuration shown in FIG. 2.
Figure 6:
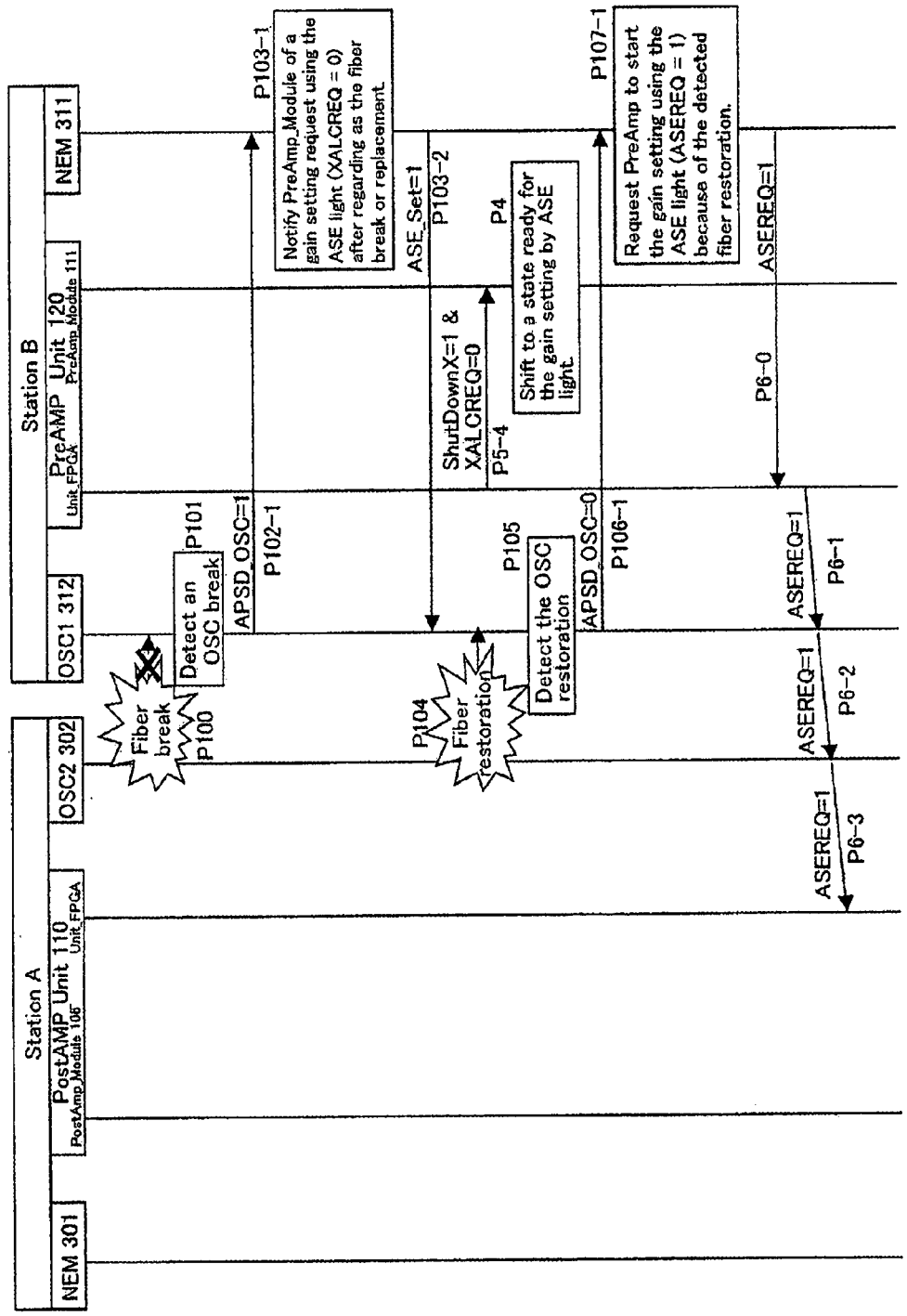
FIG. 6 shows an operation flow (part 1) in accordance with a fourth embodiment using the configuration shown in FIG. 2.

FIGS. 5 and 6 show the embodiment in the aforementioned case, illustrating an operation flow for the gain setting in receiving amplifier 111 according to the embodiment, when transmission line 202 connecting the station A with the station B has been restored from a line break condition.

In the embodiment shown in FIG. 5, on occurrence of a fiber break (process P100), optical signal controller (OSC) 312 in the station B detects the break condition of transmission line 202, based on an OSC signal break (process P101).

On detecting the break condition of transmission line 202, optical signal controller (OSC) 312 reports an information signal APSD_OSC=1, indicative of a break condition, to the controller in receiving amplifier unit 120 (process P102).

On receipt of the information signal APSD_OSC=1, the controller in receiving amplifier unit 120 judges occurrence of a fiber break, or a replacement of a fiber, and generates a gain setting request XALCREQ=0 requesting the gain setting by use of the ASE light for receiving amplifier 111 (process P103), and notifies receiving amplifier 111 of this request (process P5-4). Accordingly, receiving amplifier 111 is shifted to a state ready for the gain setting by use of the ASE light (process P4).

Meanwhile, on restoration from the fiber break (process P104), optical signal controller (OSC) 312 detects this condition (process P105), and reports an information signal APSD_OSC=0, indicative of a fiber being connected correctly, to the controller in receiving amplifier unit 120 (process P107).

The controller in receiving amplifier unit 120 then sends information ASEREQ=1, indicative of an ASE light output request, to transmitting amplifier unit 110 in the station A, through optical signal controller (OSC) 312 in the WDM transmission equipment of the station B, transmission line 212 and optical signal controller (OSC) 302 in the station A, using an OSC signal (processes P6-1, 6-2, 6-3).

The operation flow succeeding FIG. 5 is identical to the process flow shown in FIGS. 7-9.

An exemplary operation in the embodiment shown in FIG. 6 is different from the exemplary operation in the embodiment shown in FIG. 5 in the point that the information is reported to network element (NEM) 311, not to the controller in receiving amplifier unit 120, when optical signal controller (OSC) 312 detects a fiber break and restoration from the fiber break (processes P102-1, P106-1).

Corresponding to this, information ASEREQ=1 indicative of an ASE light output request is issued from network element (NEM) 311 (process P6-0), and is sent to transmitting amplifier unit 110 in the station A, through the controller in receiving amplifier unit 120, optical signal controller (OSC) 312 in the WDM transmission equipment of the station B, transmission line 212 and optical signal controller (OSC) 302 in the station A, using an OSC signal (processes P6-1, 6-2, 6-3).

Similar to the previous case, the operation flow thereafter is identical to the aforementioned process flow shown in FIGS. 7-9.

Now, hereafter the open/close control of shutter 108 in the aforementioned embodiments will be explained further. Transmitting amplifier unit 110 in the station A closes shutter 108 provided in the preceding stage of transmitting amplifier 106 on receipt of the information ASEREQ=1, indicative of an ASE light output request, from receiving amplifier unit 120 in the station B, through optical signal controller (OSC) 312, transmission line 212 and optical signal controller (OSC) 302.

On receipt of ASEREQ=0, indicative of gain setting completion included in the OSC signal, which is transmitted from receiving amplifier unit 120 in the station B, transmitting amplifier unit 110 in the station A opens shutter 108 in the preceding stage of transmitting amplifier 106, and thereby signal light is input into transmitting amplifier 106.

Namely, by closing shutter 108 while the ASE light of transmitting amplifier 106 is being output, leak light to transmitting amplifier 106 is completely shut off, and transmitting amplifier 106 can output stable light consisting of the ASE light only. Thus, it becomes possible for receiving amplifier 111 in the station B to perform the gain setting in a stable light level condition.

Here, transmitting amplifier unit 110 of the station A supervises a condition of shutter 108 provided in the preceding stage of transmitting amplifier 106. If the condition (open or close) of shutter 108 differs from the request, the ASE light output of transmitting amplifier 106 is suspended, and the malfunction of shutter 108 is reported to network element (NEM) 301.

In such a way, it becomes possible to avoid incorrect gain setting of receiving amplifier 111 in the station B.

Further, by notifying a maintenance person of the malfunction of shutter 108 from network element (NEM) 301 using a non-illustrated display unit, the maintenance person can recognize the malfunction of shutter 108.

As the embodiments of the present invention have been described referring to the drawings, the present invention brings about the following effects.

Gain setting of a receiving amplifier is performed by use of ASE light of a transmitting amplifier, without need of a particular light source for the receiving amplifier gain setting. This produces reduction in cost, which may otherwise be required for providing light sources in the whole stations.

Because gain setting of a receiving amplifier is performed by use of ASE light of a transmitting amplifier, it becomes possible to perform simultaneous gain setting of the receiving amplifiers independently in each span. Accordingly, in regard to the gain setting time required for completing the gain settings in the entire receiving amplifiers, dependency on the number of spans is avoidable, enabling the setting time reduction. Further, because the gain setting of receiving amplifiers can be performed independently in each span without depending on other spans, even when the other spans are in service, the gain setting of the receiving amplifiers becomes possible without affecting the service continued in the other spans.

By providing a shutter in the preceding stage of a transmitting amplifier, it becomes possible to shut off leak light to a transmitting amplifier completely. This enables correct gain setting of a receiving amplifier with a stable input level.

In regard to the gain setting of a receiving amplifier, entire procedures can be performed automatically, from the detection of the necessity of the gain setting to the passing-through of signal light after the completion of the gain setting. This produces reduced load of a maintenance person, as well as increased reliability.

Further, because gain setting of a receiving amplifier is performed by use of ASE light of a transmitting amplifier, it becomes possible to perform the gain setting without changing existent signal light setting.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. In a network constituted with a multi-stage connection of a plurality of wavelength division multiplex (WDM) transmission equipment, each having a receiving amplifier amplifying a WDM signal received from a preceding station, and a transmitting amplifier outputting a WDM signal to a succeeding station, a gain setting method for the receiving amplifier comprising:
   detecting the necessity of gain setting of the receiving amplifier when the power of the receiving amplifier is turned on,
   requesting WDM transmission equipment in a preceding station to output ASE light;
   in the WDM transmission equipment of the preceding station, based on the request for ASE light output, shutting off both passing-through light and added light, and outputting the ASE light corresponding to a predetermined number of wavelengths of signal light;
   in the receiving amplifier of the WDM transmission equipment in a station of interest, performing the gain setting by use of the ASE light; and
   on completion of the gain setting, the WDM transmission equipment of the station of interest requests the WDM transmission equipment of the preceding station to halt the ASE light output, and the WDM transmission equipment of the preceding station halts the ASE light output upon receiving the request and switches the output to an optical signal output.

2. In a network constituted with a multi-stage connection of a plurality of wavelength division multiplex (WDM) transmission equipment, each having a receiving amplifier amplifying a WDM signal received from a preceding station, and a transmitting amplifier outputting a WDM signal to a succeeding station, a gain setting method for the receiving amplifier comprising:
   detecting the necessity of gain setting of the receiving amplifier at the time of either restoration from a break or replacement of the fiber connecting the WDM transmission equipment sets, and requesting WDM transmission equipment in a preceding station to output ASE light;
   in the WDM transmission equipment of the preceding station, based on the request for ASE light output, shutting off both passing-through light and added light, and outputting the ASE light corresponding to a predetermined number of wavelengths of signal light;
   in the receiving amplifier of the WDM transmission equipment in a station of interest, performing the gain setting by use of the ASE light; and
   on completion of the gain setting, the WDM transmission equipment of the station of interest requests the WDM transmission equipment of the preceding station to halt the ASE light output, and the WOM transmission equipment of the preceding station halts the ASE light output upon receiving the request and switches the output to an optical signal output.

3. The gain setting method for the receiving amplifier in the WDM transmission equipment according to claim 1, wherein the ASE light corresponding to the predetermined number of wavelengths of the signal light is ASE light corresponding to one wavelength of the signal light.

4. The gain setting method for the receiving amplifier in the WDM transmission equipment according to claim 2, wherein the ASE light corresponding to the predetermined number of wavelengths of the signal light is ASE light corresponding to one wavelength of the signal light.

5. The gain setting method for the receiving amplifier in the WDM transmission equipment according to claim 1, wherein each of the plurality of WDM transmission equipment comprises a network element which overall controls each WDM transmission equipment set, and at the time of turning on the power of the receiving amplifier in the WOM transmission equipment of the station of interest, the network element in the station of interest detects the necessity of the gain setting of the receiving amplifier.

6. The gain setting method for the receiving amplifier in the WDM transmission equipment according to claim 2, wherein each of the plurality of WDM transmission equipment comprises a network element which overall controls each WDM transmission equipment set, and at the time of turning on the power of the receiving amplifier in the WDM transmission equipment of the station of interest, the network element in the station of interest detects the necessity of the gain setting of the receiving amplifier.

7. The gain setting method for the receiving amplifier in the WDM transmission equipment according to claim 1, wherein the shutoff of the passing-through light and the added light is performed by closing a shutter disposed on the input side of the transmitting amplifier in the preceding station.

8. The gain setting method for the receiving amplifier in the WDM transmission equipment according to claim 2, wherein the shutoff of the passing-through light and the added light is performed by closing a shutter disposed on the input side of the transmitting amplifier in the preceding station.

9. The gain setting method for the receiving amplifier in the WDM transmission equipment according to claim 7,
wherein, when outputting the ASE light, the transmitting amplifier in the preceding station supervises a condition of the shutter disposed on the input side of the transmitting amplifier in the preceding station, and on occurrence of a malfunction, the malfunction is reported to a maintenance person.

10. The gain setting method for the receiving amplifier in the WDM transmission equipment according to claim 8,
wherein, when outputting the ASE light, the transmitting amplifier in the preceding station supervises a condition of the shutter disposed on the input side of the transmitting amplifier in the preceding station, and on occurrence of a malfunction, the malfunction is reported to a maintenance person.

11. The gain setting method for the receiving amplifier in the WDM transmission equipment according to claim 1,
wherein, in the WOM transmission equipment of the station of interest, a stable condition of the ASE light output of the transmitting amplifier in the preceding station is supervised, and on detection of an unstable condition of the transmitting amplifier in the preceding station while the gain setting of the receiving amplifier is being performed in the station of interest, the gain setting of the receiving amplifier in the station of interest is canceled, and after detecting a stable condition of the ASE light output of the transmitting amplifier in the preceding station, the gain setting of the receiving amplifier in the station of interest is performed afresh.

12. The gain setting method for the receiving amplifier in the WDM transmission equipment according to claim 2,
wherein, in the WDM transmission equipment of the station of interest, a stable condition of the ASE light output of the transmitting amplifier in the preceding station is supervised, and on detection of an unstable condition of the transmitting amplifier in the preceding station while the gain setting of the receiving amplifier is being performed in the station of interest, the gain setting of the receiving amplifier in the station of interest is canceled, and after detecting a stable condition of the ASE light output of the transmitting amplifier in the preceding station, the gain setting of the receiving amplifier in the station of interest is performed afresh.

* * * * *

UNITED STATES PATENT AND TRADEMARK OFFICE
CERTIFICATE OF CORRECTION

PATENT NO. : 7,315,696 B2  Page 1 of 1
APPLICATION NO. : 10/725577
DATED : January 1, 2008
INVENTOR(S) : Manabu Suzuki et al.

It is certified that error appears in the above-identified patent and that said Letters Patent is hereby corrected as shown below:

On the title page item (57), Column 2 (Abstract), Line 1, after "amplifier" delete ",".

On the title page item (57), Column 2 (Abstract), Line 12, after "interest" delete ",".

On the title page item (57), Column 2 (Abstract), Line 13, change "eouipment" to --equipment--.

On the title page item (57), Column 2 (Abstract), Line 15, after "station" delete ",".

Column 12, Line 25, change "WOM" to --WDM--.

Column 12, Line 45, change "WOM" to --WDM--.

Column 13, Line 23, change "WOM" to --WDM--.

Signed and Sealed this

Twenty-second Day of July, 2008

JON W. DUDAS
*Director of the United States Patent and Trademark Office*